US008949740B2

(12) United States Patent
Kurosawa et al.

(10) Patent No.: US 8,949,740 B2
(45) Date of Patent: Feb. 3, 2015

(54) SELECTING MENU FOR AN OBJECT IN A GRAPHICAL USER INTERFACE (GUI) ENVIRONMENT

(75) Inventors: Ryoji Kurosawa, Tokyo (JP); Kimiko Mamada, Kanagawa (JP); Kaoru Shinkawa, Tokyo (JP); Yuriko Sugisaki, Kanagawa (JP); Yoshinori Tahara, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 13/402,944

(22) Filed: Feb. 23, 2012

(65) Prior Publication Data
US 2012/0159398 A1    Jun. 21, 2012

Related U.S. Application Data

(63) Continuation of application No. PCT/JP2010/064215, filed on Aug. 24, 2010.

(30) Foreign Application Priority Data

Aug. 31, 2009   (JP) ................... 2009-200429

(51) Int. Cl.
*G06F 3/00*     (2006.01)
*G06F 3/0482*   (2013.01)

(52) U.S. Cl.
CPC .................... *G06F 3/0482* (2013.01)
USPC ........... 715/841; 715/800; 715/815; 715/825; 715/858

(58) Field of Classification Search
USPC ......... 715/741, 756, 757, 841, 800, 843, 845, 715/858, 815, 825
See application file for complete search history.

(56) References Cited

U.S. PATENT DOCUMENTS 5,870,090 A * 2/1999 Takai et al. .................... 715/800
2004/0021647 A1 * 2/2004 Iwema et al. ................. 345/179
(Continued)

FOREIGN PATENT DOCUMENTS

JP      02242323 A     9/1990
JP      08123647 A     5/1996
(Continued)

OTHER PUBLICATIONS

International Search Report for PCT Application No. PCT/JP2010/064215, including English translation, as provided by WIPO; Mailing Date of Oct. 19, 2010; Japanese Patent Office.
(Continued)

*Primary Examiner* — Doon Chow
*Assistant Examiner* — Tam Tran
(74) *Attorney, Agent, or Firm* — Thomas E. Lees, LLC

(57) ABSTRACT

Provided is a method applied to a computer system including a display device and a pointing device for operating a pointer displayed in a display region of the display device in accordance with an operation by a user. In the method, a position of the pointer is stored as a first position in response to receipt of a first operation performed by the user, a first menu including multiple items is displayed at a position corresponding to the first position, a position of the pointer is stored as a second position in response to receipt of a second operation performed by the user, and a second menu is displayed, being changed from the first menu based on a distance between the first position and the second position.

18 Claims, 12 Drawing Sheets

(56) References Cited

U.S. PATENT DOCUMENTS

| | | | |
|---|---|---|---|
| 2004/0075695 A1* | 4/2004 | Chew et al. | 345/810 |
| 2005/0183034 A1* | 8/2005 | Chitsaz et al. | 715/810 |
| 2010/0223577 A1* | 9/2010 | Bennett et al. | 715/800 |
| 2010/0241979 A1* | 9/2010 | Apted | 715/765 |
| 2010/0287468 A1* | 11/2010 | Reifman et al. | 715/702 |
| 2011/0196812 A1* | 8/2011 | Jezek, Jr. | 705/36 R |
| 2011/0320337 A1* | 12/2011 | Buck | 705/37 |

FOREIGN PATENT DOCUMENTS

| | | |
|---|---|---|
| JP | 2000339482 A | 12/2000 |
| JP | 2002007023 A | 1/2002 |
| JP | 2002091649 A | 3/2002 |
| JP | 2006113705 A | 4/2006 |
| JP | 2007287135 A | 11/2007 |
| WO | 2011024773 A1 | 3/2011 |

OTHER PUBLICATIONS

Notification of Transmittal of Translation of the International Preliminary Report on Patentability for PCT Application No. PCT/JP2010/064215; Mailing Date of Mar. 22, 2012, The International Bureau of WIPO, Geneva, Switzerland.

* cited by examiner

SELECTING MENU FOR AN OBJECT IN A GRAPHICAL USER INTERFACE (GUI) ENVIRONMENT

CROSS-REFERENCE TO RELATED APPLICATIONS

This application is a continuation of International Application No. PCT/JP2010/064215, filed Aug. 24, 2010, entitled "METHOD, COMPUTER PROGRAM AND COMPUTER SYSTEM FOR SELECTING MENU FOR OBJECT IN GRAPHICAL USER INTERFACE (GUI) ENVIRONMENT", which claims the benefit of JP 2009/200429 filed, Aug. 31, 2009, entitled "METHOD, COMPUTER PROGRAM AND COMPUTER SYSTEM FOR SELECTING MENU FOR OBJECT IN GRAPHICAL USER INTERFACE (GUI) ENVIRONMENT", the disclosures of which are hereby incorporated by reference.

BACKGROUND

Aspects of the present invention relate to a technique to improve usability in a GUI environment, and particularly aims for menu selection excellent in operability.

In order to improve usability in the GUI environment, techniques described in Japanese Patent Application Publication Nos. 2002-91649, 2006-113705, Hei 8-123647, 2000-339482, and the like have been proposed conventionally.

Generally, in many applications using the GUI, the user has to select a menu item displayed by clicking on an object. In an application running on a certain operating system, the user presses the right button of the mouse to make a menu show up, and then selects an item in the menu with the mouse or a cursor key. When there are a few items shown in the menu, there are a few operational problems. However, there are many applications having a menu shown with many items or a menu shown in multiple hierarchical levels. When a frequently used menu item by the user is located in the lower part of the menu or in a lower hierarchical level, the operability is not exactly good.

Aside from a challenge to enhance efficiency in dealing with many menu items, there exists a case where it is effective to give a certain numerical amount simultaneously at the time of item selection. For example, suppose that options such as "increase volume" and "decrease volume" are provided. If the user is allowed to not only simply select an item but also simultaneously designate "how much" (degree) in the application, the user enjoys a better operability. General menu selection in the GUI environment is not designed to allow the amount to be designated at the same time as selection. Accordingly, the user has to designate the amount, when necessary, by making typical candidates show up as submenu items or making another UI (including a dialog box) show up. This is another challenge for operation efficiency.

BRIEF SUMMARY

According to aspects of the present invention, a method for operating a pointer in accordance with an operation by a user, comprises storing a position of a pointer displayed in a display region of a display device of a computer system as a first position in response to receipt of a first operation performed by the user, where a pointing device operates the pointer and displaying a first menu including a plurality of items at a position corresponding to the first position. The method also comprises storing a position of the pointer as a second position in response to receipt of a second operation performed by the user and displaying a second menu changed from the first menu based on a distance between the first position and the second position. According to further aspects of the present invention, a computer program that is executed in a computer system including a display device and a pointing device for operating a pointer displayed in a display region of the display device in accordance with an operation by a user, the computer program causing the computer system to execute the above method.

According to yet further aspects of the present invention, a computer system comprises a display device, a pointing device for operating a pointer displayed in a display region of the display device in accordance with an operation by a user, a storage unit and an arithmetic and control unit. The arithmetic and control unit is configured to cause the storage device to store a position of the pointer as a first position in response to receipt of a first operation performed by the user and the display device to display a first menu including a plurality of items at a position corresponding to the first position. The arithmetic and control unit is further configured to cause the storage device to store a position of the pointer as a second position in response to receipt of a second operation performed by the user and the display device to display a second menu changed from the first menu based on a distance between the first position and the second position.

DETAILED DESCRIPTION

Figure 1:
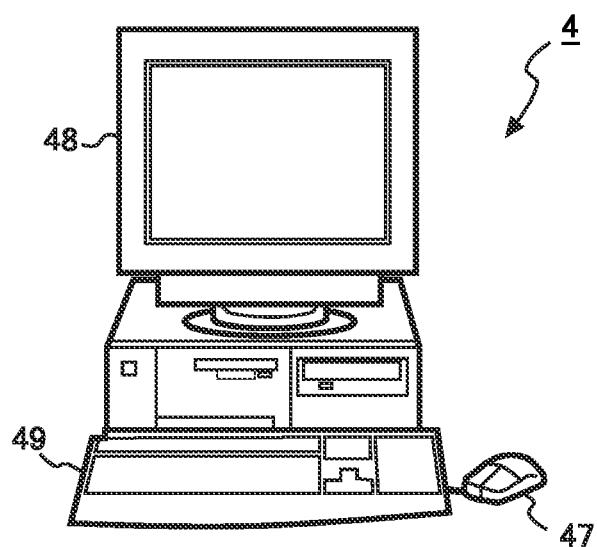
FIG. 1 shows an external view of a personal computer according to an embodiment of the present invention.

One of the aspects of the present invention is to provide a method, a computer program and a computer system by which operations of selecting a menu and designating an amount are efficiently performed in a GUI environment.

Aspects of the present invention can be understood as a method applied to a computer system including: a display device; a pointing device for operating a pointer displayed in a display region of the display device in accordance with an operation by a user; a storage unit; and an arithmetic and control unit. In this case, the method includes the following steps in which the arithmetic and control unit causes: the storage unit to store a position of the pointer as a first position in response to an event where a first operation performed by the user is received through the pointing device; the display device to display a first menu including multiple items at a position corresponding to the first position; the storage unit to store a position of the pointer as a second position in response to an event where a second operation performed by the user is received through the pointing device; and the display device to display a second menu changed from the first menu based on a distance between the first position and the second position.

In the method, the first operation can be an operation of designating an object in the display region by using the pointer. In addition, the second operation can be an operation of dragging the object with the pointer. Focusing on a display region of a menu, in order to enhance visibility, a display region of the second menu can be configured to be larger than a display region of the first menu. Furthermore, the display region of the second menu may be configured to be scalable, namely, scaled up with the increase of the distance between the first position and the second position, and scaled down with the decrease of the distance between the first position and the second position. Focusing on items in the second menu, the mode of the items can be changed based on the distance between the first position and the second position.

As an example, the following can be implemented to prevent a misoperation in a small displayed menu. Specifically, in response to an event where the distance between the first position and the second position exceeds a first threshold, the items in the second menu (which have been non-selectable) are displayed in a selectable manner. In other words, in response to an event where the distance between the first position and the second position falls below the first threshold, the items in the second menu (which have been selectable) can be displayed in a non-selectable manner. As another example, the following can be implemented in consideration of selection frequency of the items. In response to an even where the distance between the first position and the second position exceeds a second threshold, the second menu additionally includes one or more items not included in the first menu in addition to the items included in the first menu. In other words, in response to an even where the distance between the first position and the second position falls below the second threshold, items which are not included in the first menu but included in the second menu can be deleted in the configuration. In sum, among the items included in the second menu, the items included also in the first menu can be items which are more frequently selected than the items not included in the first menu are. Further, as a combination of these examples, in response to an even where the distance between the first position and the second position exceeds a first threshold, the items included in the first menu can be displayed in a selectable manner, and in response to an event where the distance between the first position and the second position exceeds the second threshold higher than the first threshold, the items not included in the first menu can be displayed in a selectable manner.

Here, suppose that the first position is $P1(X1, Y1)$ and the second position is $P2(X2, Y2)$. The distance between the first position and the second position may be a distance between P1 and P2 on a plane (the root square of the sum of a square of $|X2-X1|$ and a square of $|Y2-Y1|$), or may be represented by $|X2-X1|$ or $|Y2-Y1|$. When the distance is represented by $|X2-X1|$, a selection can be made from the (multiple) items in the second menu based on a value or magnitude of $(Y2-Y1)$ (this case is generally preferable). In contrast, when the distance is represented by $|Y2-Y1|$, a selection can be made from the (multiple) items in the second menu based on a value or magnitude of $(X2-X1)$. As an example of the former case, the following configuration can be implemented. In this case, suppose that the first position is $P1(X1, Y1)$, the second position is $P2(X2, Y2)$, and the second menu includes multiple items arranged in a Y direction. Firstly, the second menu changed from the first menu based on the value of $X2-X1$ is displayed. Then, in response to receipt of a third operation performed by the user, one of the multiple items is selected based on the value of $Y2-Y1$ (specifically, based on a value of $(Y2-Y1)/|X2-X1|$). Furthermore, another configuration can also be implemented. In the configuration, in response to receipt of the third operation performed by the user, none of the multiple items is selected in response to an event where the value of $Y2-Y1$ (specifically, based on a value of $(Y2-Y1)/|X2-X1|$) exceeds a third threshold.

Suppose that the pointing device is a mouse having a button. In this case, the first operation is an operation of pressing the button, the second operation is an operation of moving the mouse with the button kept pressed (dragging), and the third operation is an operation of releasing the button. According to the configuration described in the previous paragraph, the size of the second menu is determined based on the distance of dragging, and an item to be selected in the second menu is determined based on a direction of dragging (in other words, the angle of the dragging movement).

The item to be selected may be one of values which are not consecutive (for example, various commands) or values which are consecutive (for example, parameter values such as volume).

In addition, there is a case where the menu items include a third menu in a lower hierarchical level. In this case, suppose that: the first position is $P1(X1, Y1)$ and the second position is $P2(X2, Y2)$; the second menu includes multiple items arranged in the Y direction; and in the step of displaying the second menu, the second menu changed from the first menu based on the value of $X2-X1$ is displayed. In this case, the following configuration can be implemented. Specifically, in response to receipt of the third operation performed by the user, one of the multiple items is selected based on the value of $Y2-Y1$. Then, on condition that the one item thus selected includes a submenu in a lower level, the third menu is displayed. Here, the third operation is an operation of moving the pointer in a direction opposite to a direction from P1 to P2 in an X direction and same as a direction from P1 to P2 in the Y direction. Thus, the third menu can be displayed at a side of the one item in the direction opposite to the direction from P1 to P2 in the X direction. On the assumption that the pointing device is a mouse having a button, these operations can be defined as follows. The first operation is an operation of pressing the button (clicking). The second operation is an operation of moving the mouse in a certain direction with the button kept pressed (dragging). The third operation is an operation of moving the mouse in another direction with the button kept pressed (opposite dragging).

Aspects of the present invention can also be understood as a computer program that is executed in a computer system including: a display device; a pointing device for operating a pointer displayed in a display region of the display device in accordance with an operation by a user; a storage unit; and an arithmetic and control unit. In this case, the computer program causes the computer system to execute the steps of: storing a position of the pointer as a first position in response to receipt of a first operation performed by the user; displaying a first menu including multiple items at a position corresponding to the first position; storing a position of the pointer as a second position in response to receipt of a second operation performed by the user; and displaying a second menu changed from the first menu based on a distance between the first position and the second position.

Aspects of the present invention can also be understood as a computer system including: a display device; a pointing device for operating a pointer displayed in a display region of the display device in accordance with an operation by a user; a storage unit; and an arithmetic and control unit. In this case, the arithmetic and control unit of the computer system is configured to cause: the storage device to store a position of the pointer as a first position in response to receipt of a first operation performed by the user; the display device to display a first menu including a plurality of items at a position corresponding to the first position; the storage device to store a position of the pointer as a second position in response to receipt of a second operation performed by the user; and the display device to display a second menu changed from the first menu based on a distance between the first position and the second position.

When understood as the computer program or the computer system, aspects of the present invention naturally has substantially the same technical features as when understood as the method as described above.

Figure 2:
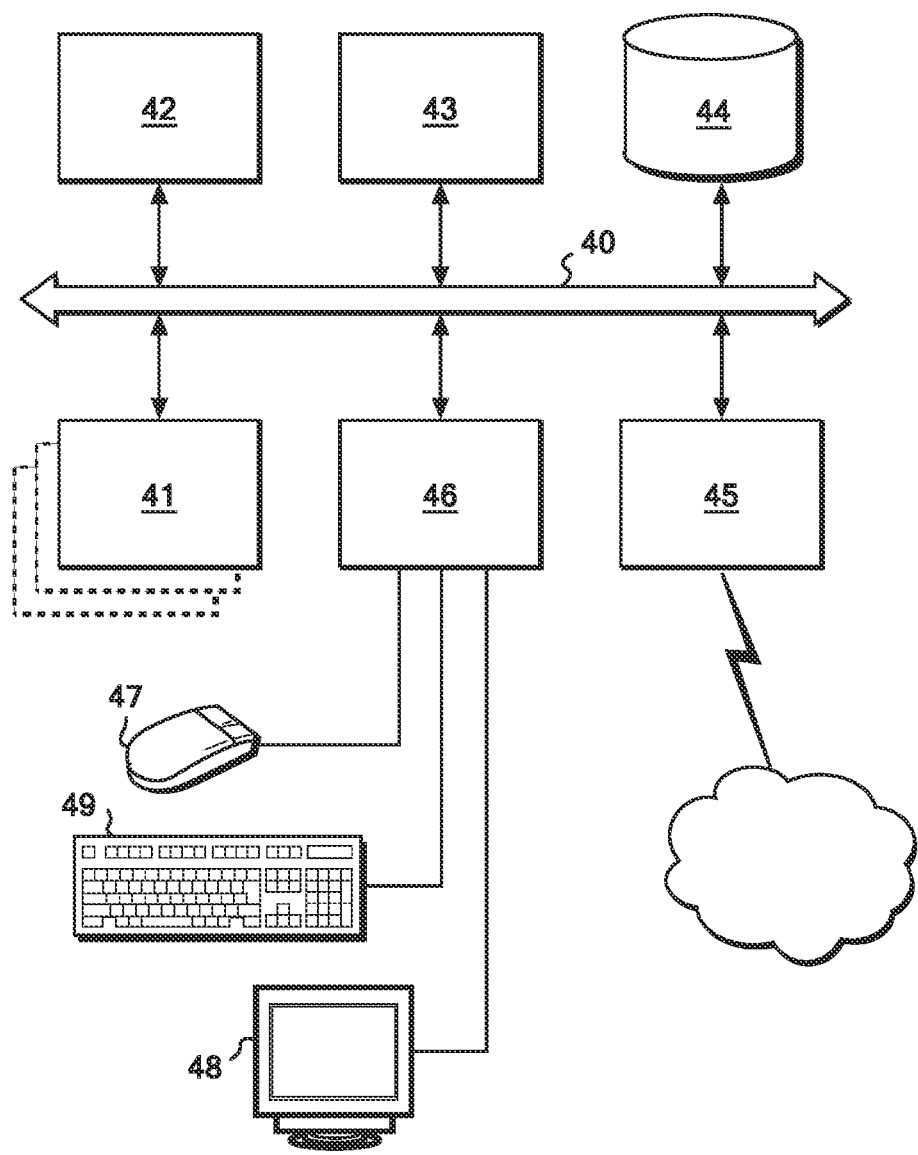
FIG. 2 shows a functional block diagram illustrating a hardware configuration of the personal computer.
Figure 3:
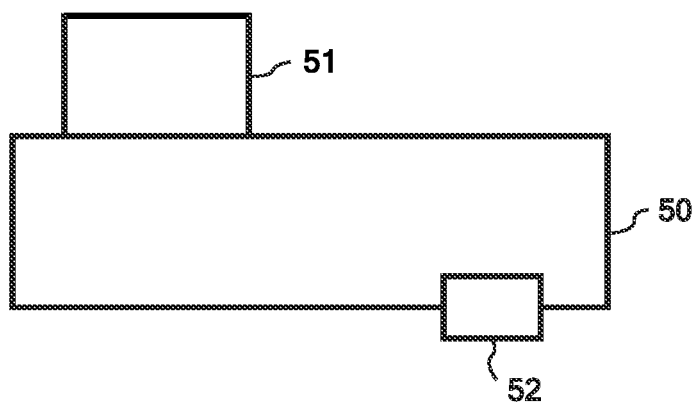
FIG. 3 shows a functional block diagram illustrating a software configuration of the personal computer.

Firstly, hardware and software configurations of a personal computer (a computer system) 4 according to this embodiment will be described with reference to FIGS. 1 to 3. FIG. 1 shows an external view of the personal computer 4 according to this embodiment. FIGS. 2 and 3 show functional block diagrams illustrating a hardware configuration of the personal computer 4 and a software configuration thereof, respectively.

As the hardware configuration, the personal computer 4 includes: a (low-speed and high-speed) bus 40; a CPU (an arithmetic and control unit) 41 connected to the bus 40; a random access memory (RAM: a storage unit) 42; a read only memory (ROM: a storage unit) 43; a hard disk drive (HDD: a storage unit) 44; a communication interface 45; and an input-output interface 46. The personal computer 4 further includes a mouse (a pointing device) 47; a flat panel display (a display device) 48, a keyboard 49; and the like. Note that the description is given on the assumption that the personal computer 4 employs a general personal computer architecture, but, for the pursuit of better data processing capability and availability, the CPU 41, the HDD 44 and the like may be multiplexed. In addition, various types of computer systems may be employed including not only the desk-top type, but also laptop and tablet personal computers, a personal digital assistant (PDA), a smartphone and the like.

As the software configuration, the personal computer 4 includes: an operating system (OS) 50 that provides basic functions; application software 51 that utilizes functions of the OS 50; and driver software 52 for the mouse 47. For example, a general commercial or open-source operating system may be employed as the OS 50. Functions according to this embodiment to be described later are implemented in one or some of the software 50 to 52. The software 50 to 52 are loaded on the RAM 42, and executed by the CPU 41 or the like.

Figure 4:
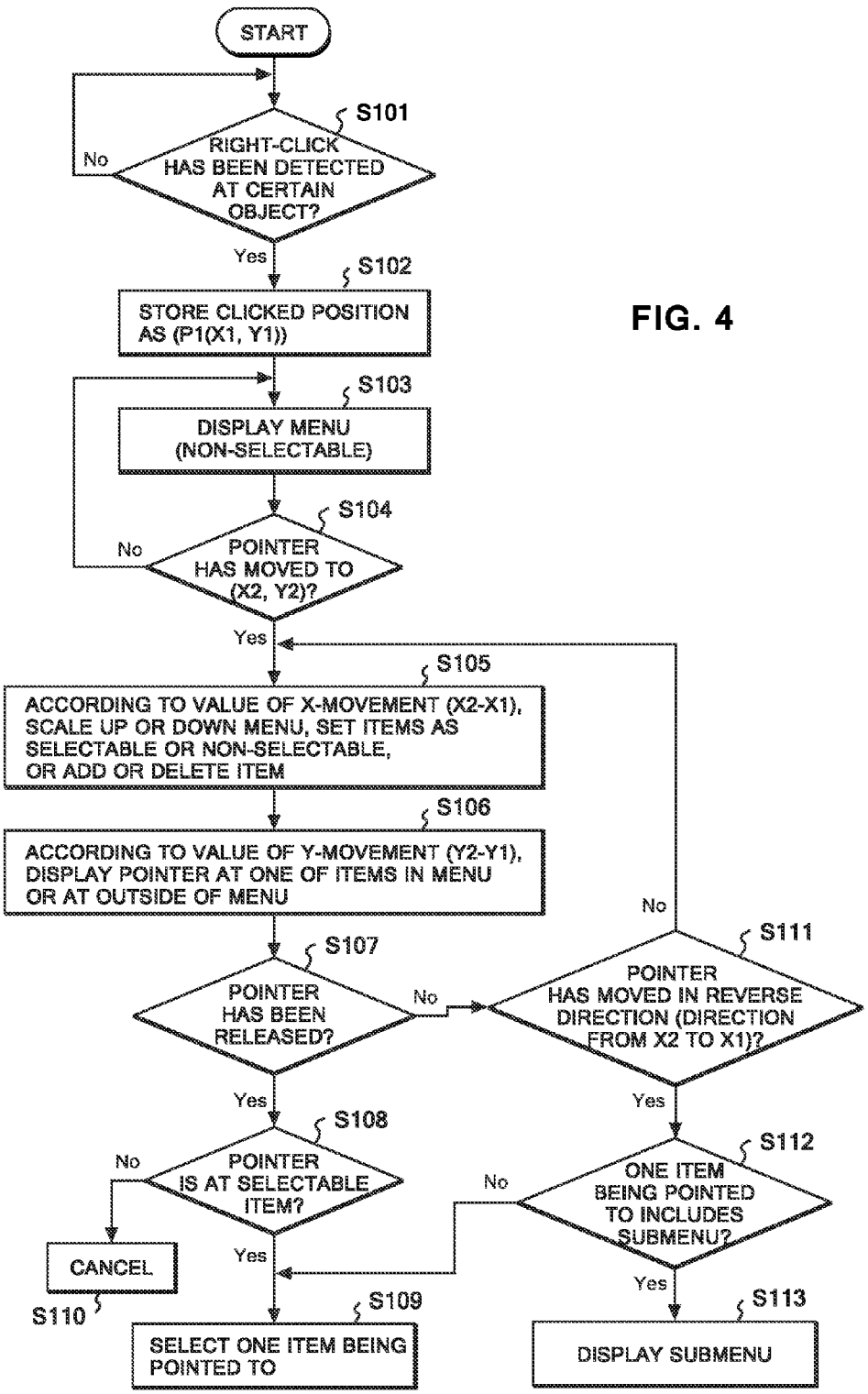
FIG. 4 shows a flowchart explaining operations of the personal computer.
Figure 5:
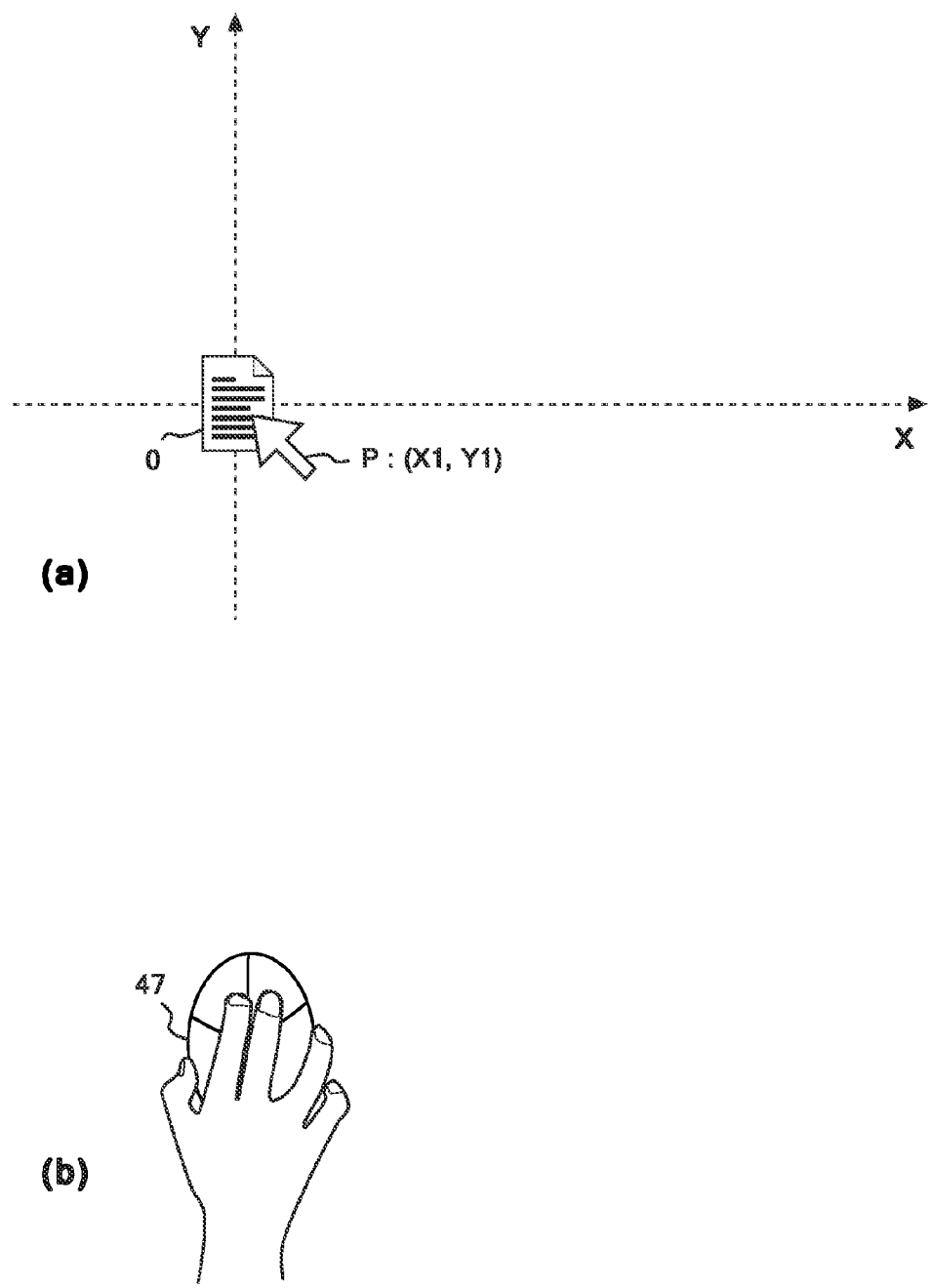
FIGS. 5A and 5B show an operation of a mouse (FIG. 5(*b*)) by a user and a state of a display region of a display (FIG. 5(*a*)) according to the operation.
Figure 6:
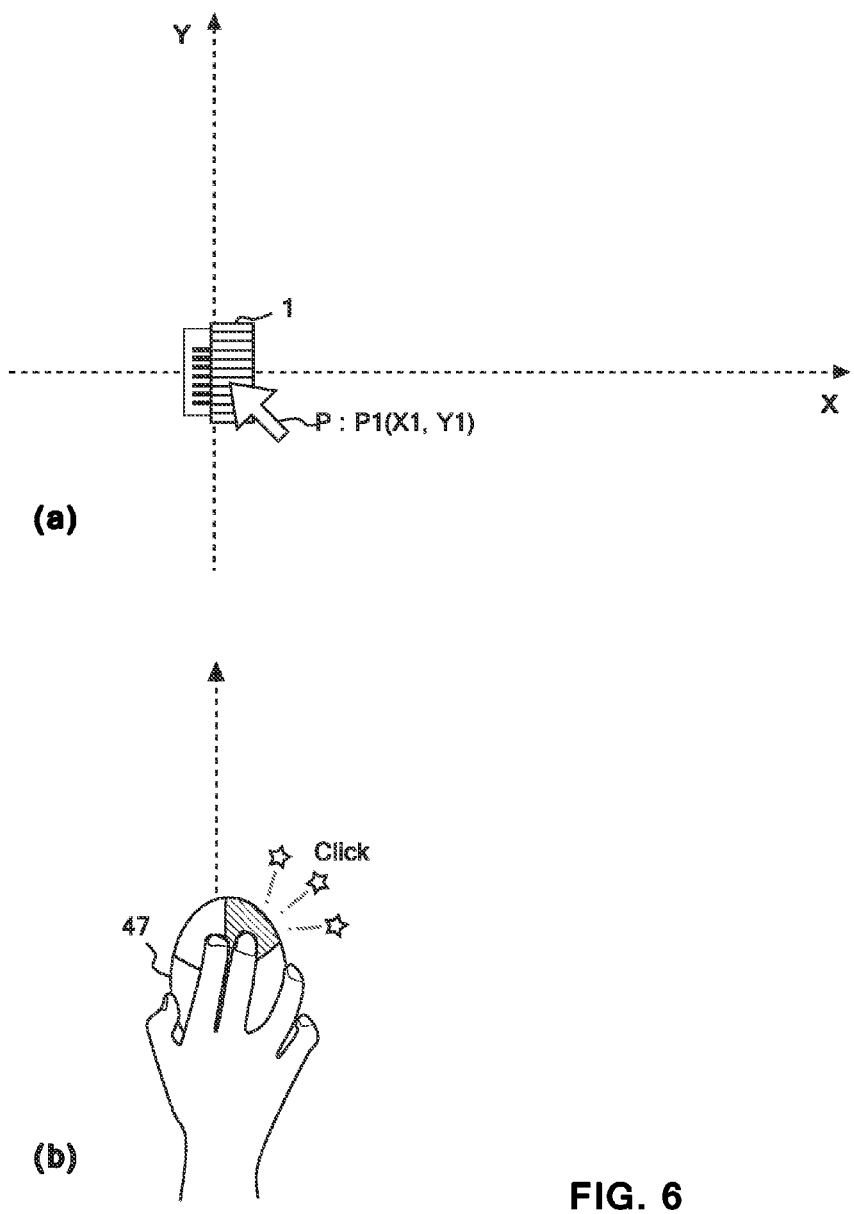
FIGS. 6A and 6B show an operation of the mouse (FIG. 6(*b*)) by the user and a state of the display region of the display (FIG. 6(*a*)) according to the operation.
Figure 7:
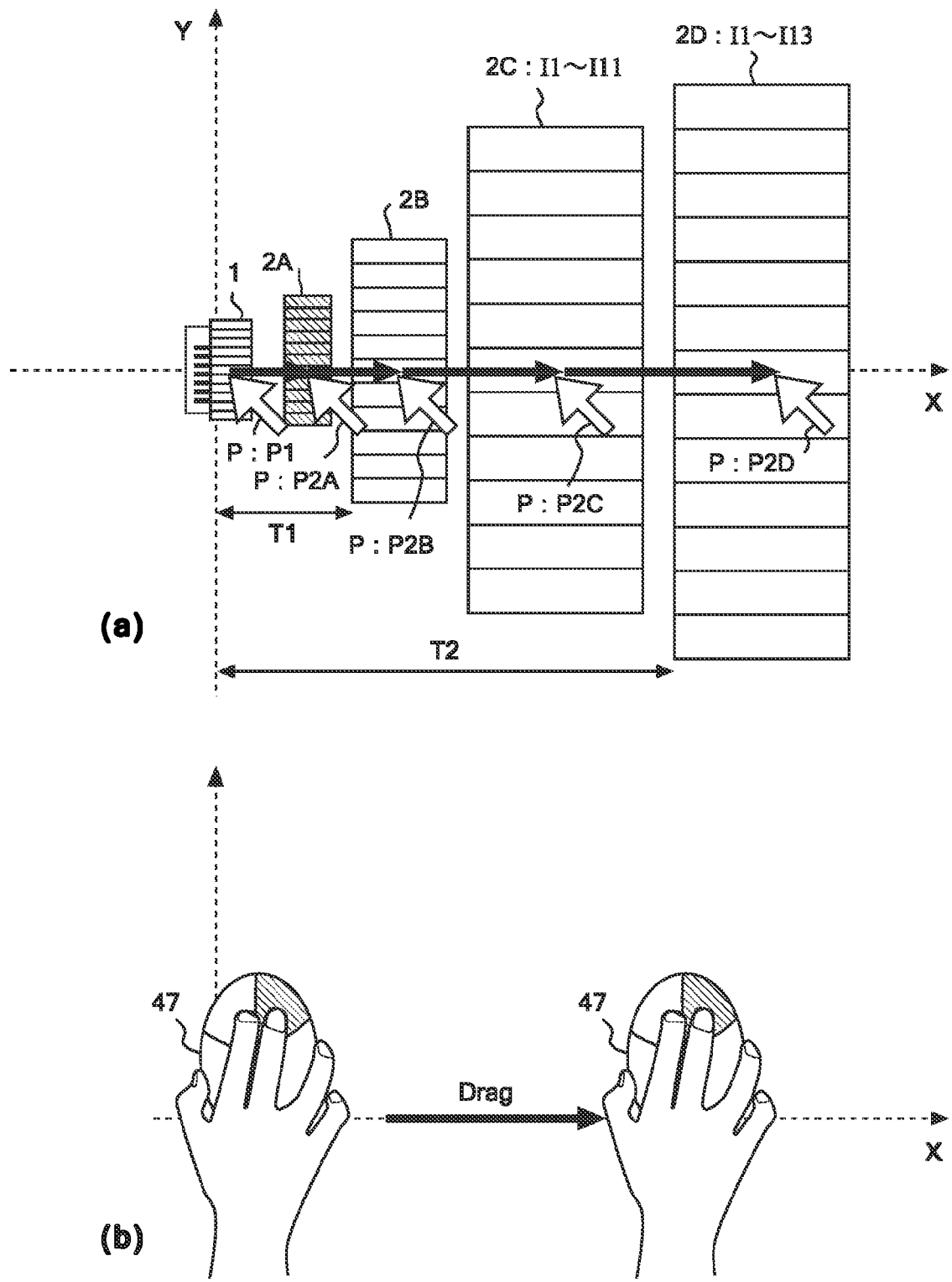
FIGS. 7A and 7B show an operation of the mouse (FIG. 7(*b*)) by the user and a state of the display region of the display (FIG. 7(*a*)) according to the operation.
Figure 8:
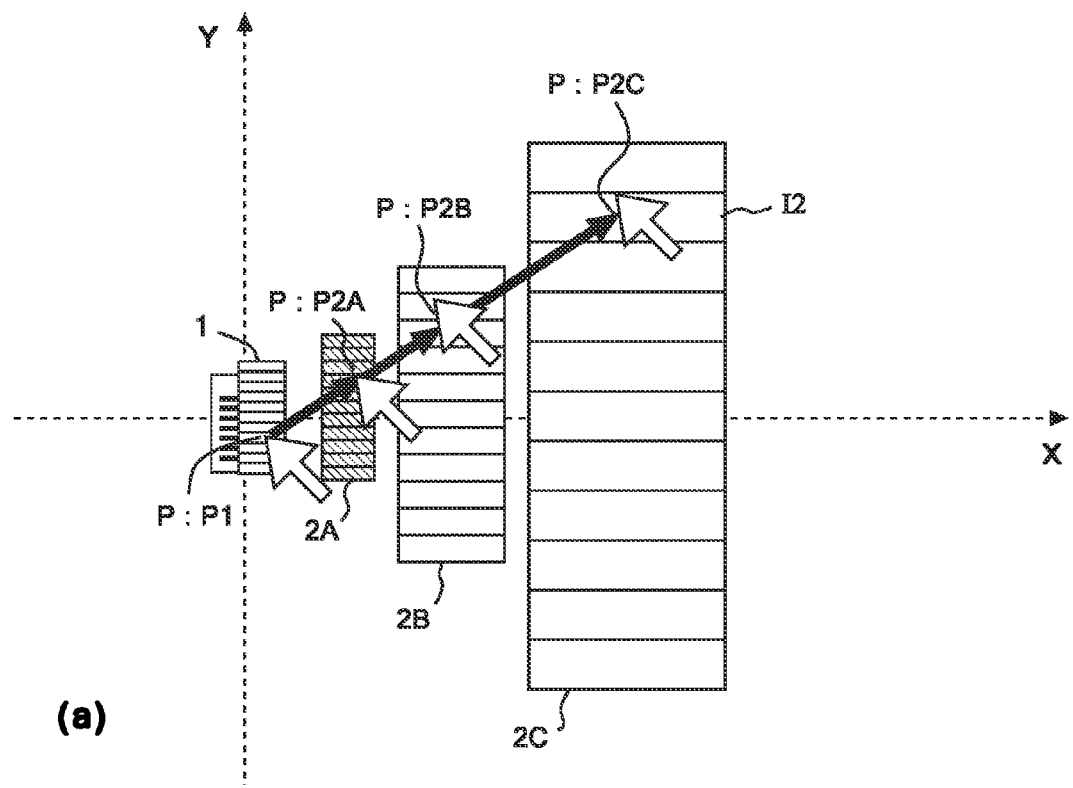
FIGS. 8A and 8B show an operation of the mouse (FIG. 8(*b*)) by the user and a state of the display region of the display (FIG. 8(*a*)) according to the operation.
Figure 8:
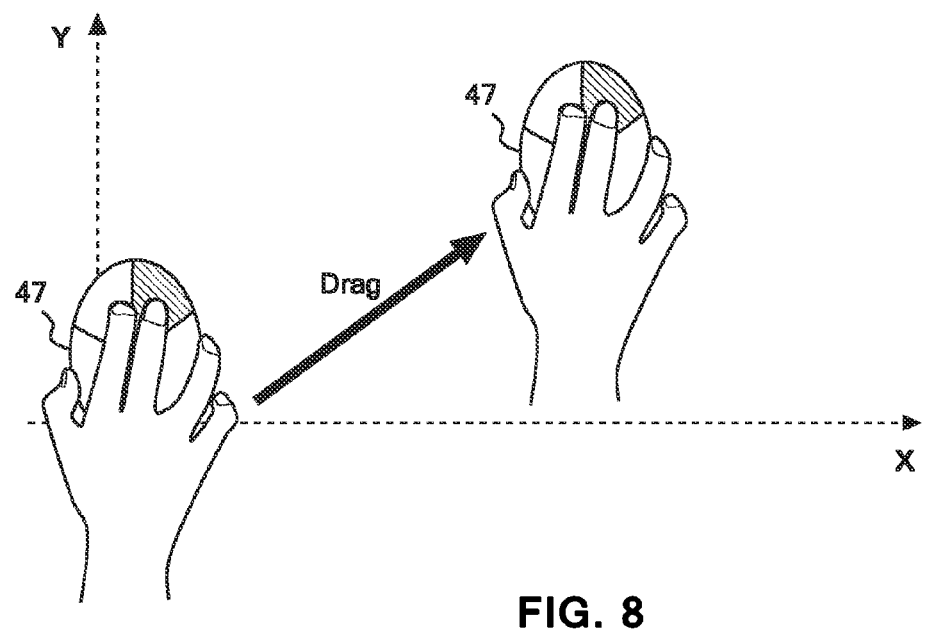
Figure 9:
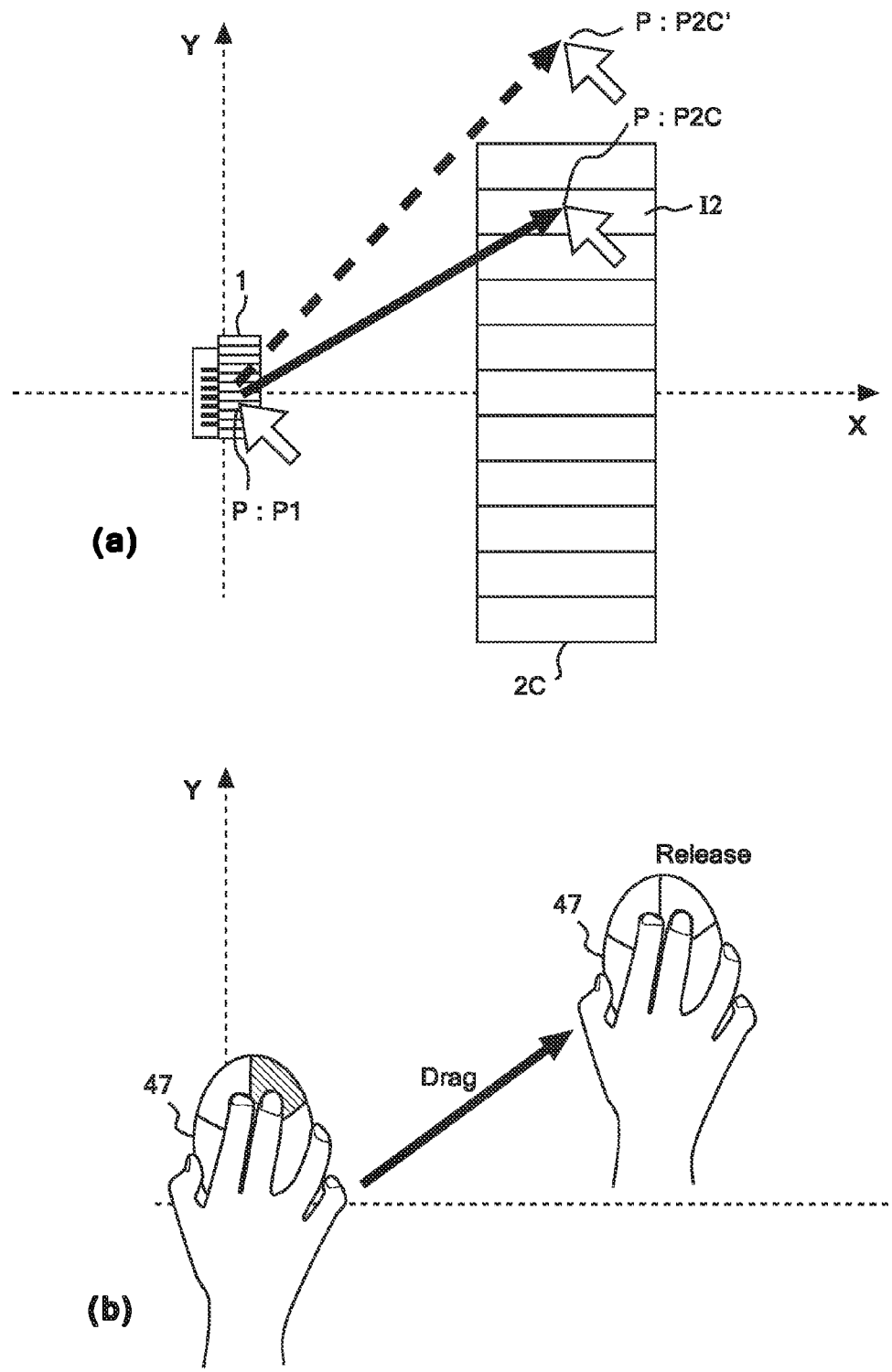
FIGS. 9A and 9B show an operation of the mouse (FIG. 9(*b*)) by the user and a state of the display region of the display (FIG. 9(*a*)) according to the operation.
Figure 10:
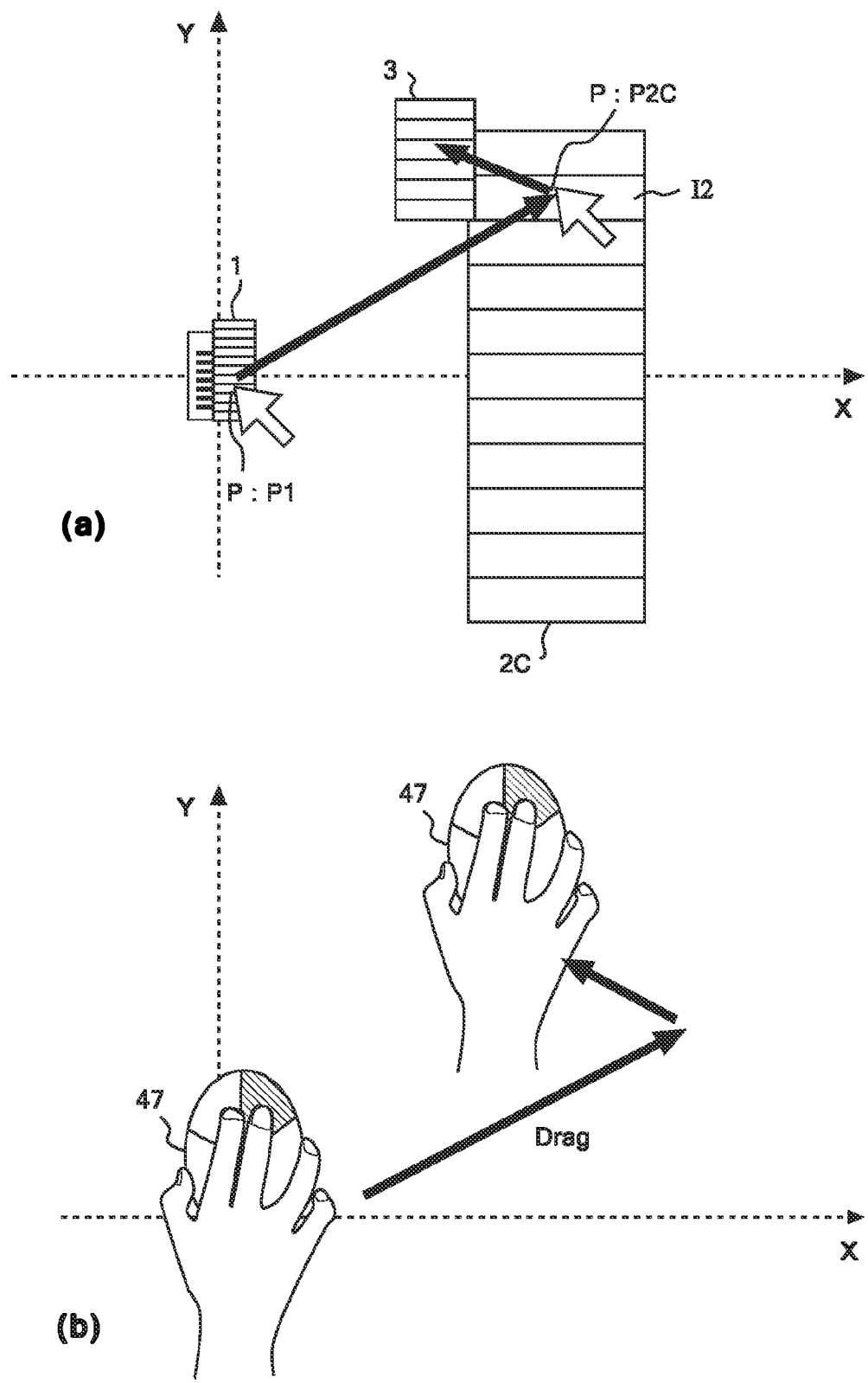
FIGS. 10A and 10B show an operation of the mouse (FIG. 10(*b*)) by the user and a state of the display region of the display (FIG. 10(*a*)) according to the operation.
Figure 11:
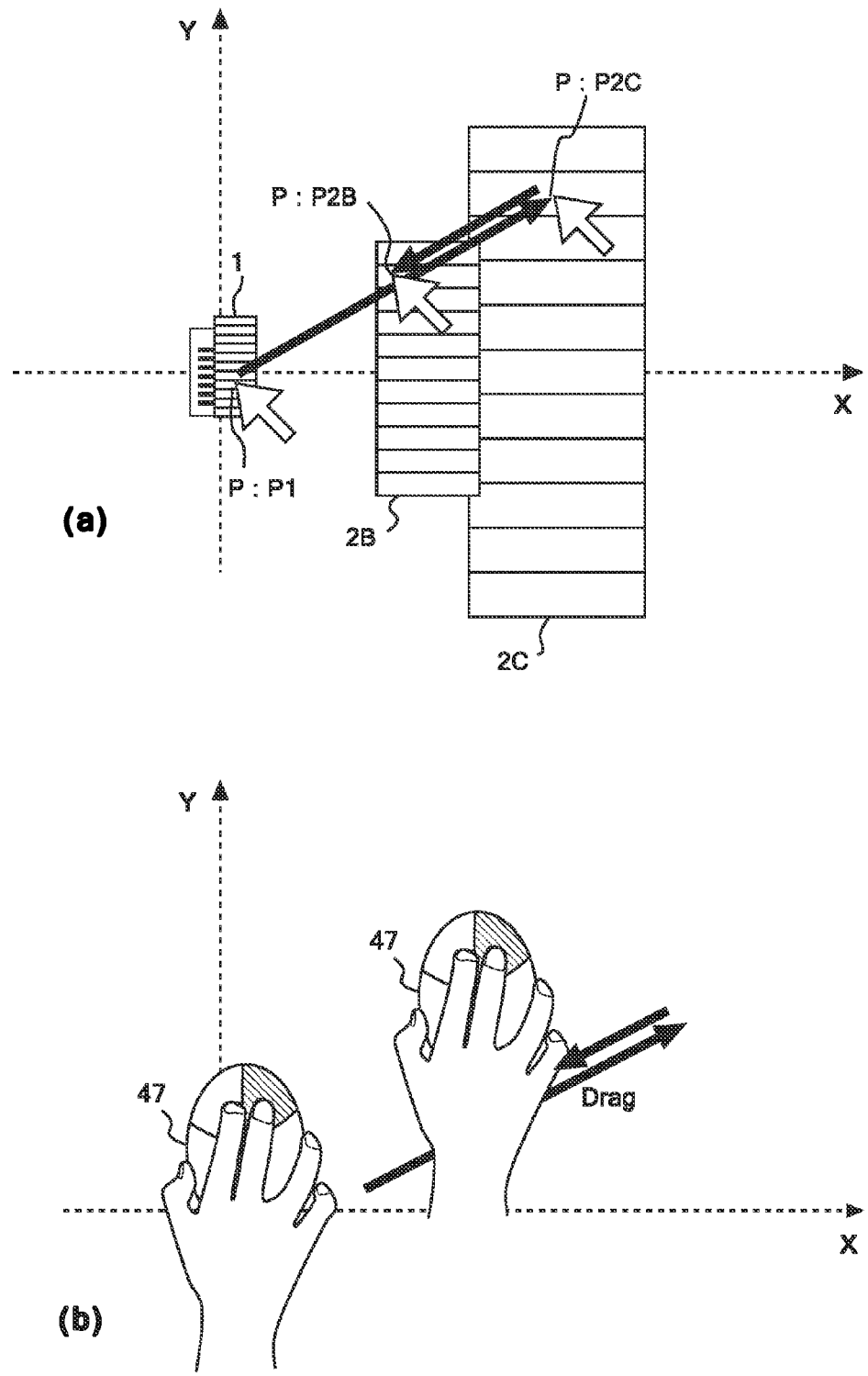
FIGS. 11A and 11B show an operation of the mouse (FIG. 11(*b*)) by the user and a state of the display region of the display (FIG. 11(*a*)) according to the operation.

Next, operations and functions of the personal computer 4 according to this embodiment will be described with reference to FIGS. 4 to 11B. FIG. 4 shows a flowchart explaining the operations of the personal computer 4. FIGS. 5B, 6B, 7B, 8B, 9B, 10B and 11B show user's operations of the mouse 47, and FIGS. 5A, 6A, 7A, 8A, 9A, 10A and 11A accordingly show states of (part of) a display region of the flat panel display 48 (simply referred to as a "display 48" below). Hereinbelow, a description will be given with reference to the flowchart in FIG. 4.

The user operates the mouse 47 and thereby operates a pointer P in the display region of the display 48. Here, an object O is displayed at a position (first position) P1(X1, Y1) defined as an origin in an XY coordinate system. FIG. 5A shows a state in which the pointer P is overlapped with the object O. When the user right-clicks the mouse 47 in this state (see S101 in FIG. 4 and FIG. 6B), the personal computer 4 stores the position P1 in the RAM 42 (see S102 in FIG. 4) and displays an initial menu (first menu) 1 on the display 48 at a position corresponding to P1 (near the position P1 in an X direction, in this case) (see S103 in FIG. 4 and FIG. 6A).

When the user further operates the mouse 47 by moving the pointer P from the position P1 to a position P2(X2, Y2) while keeping holding down the right button (that is, by dragging) (see S104 in FIG. 4), the following functions are exerted in two phases in accordance with a relation between the position P1 and the position P2 (see S105 and S106 in FIG. 4).

In the first phase, based on a value (X2−X1) of movement in the X direction (hereinafter, referred to as X-movement) between the position P1 and the position P2, the following functions are exerted. 1. The menu is scaled up and down. 2. Items in the menu are switched to be selectable or non-selectable. 3. One or more items are added to or deleted from (increased or decreased in) the menu (see S105 in FIG. 4). Each of the functions will be described below with reference to FIGS. 7A and 7B. Here, for simplicity, the descriptions will be given on the assumption that a value (Y2−Y1) of movement in a Y direction (hereinafter, referred to as Y-movement) between the position P1 and the position P2 is zero. In addition, the XY coordinate system on the display 48 does not necessarily coincide with an XY coordinate system showing moving directions of the mouse 47.

1. Scaling Up and Down Menus

When the user drags the mouse 47 in the X direction, a scaled-up menu (second menu) 2 is displayed at the position P2. Specifically, when the pointer P is moved to a position P2A(X2A, Y2A), a scaled-up menu 2A is displayed at the position P2A (with the position P2A substantially as the center). When the pointer P is moved to a position P2B(X2B, Y2B), a scaled-up menu 2B is displayed at the position P2B (with the position P2B substantially as the center). When the pointer P is moved to a position P2C(X2C, Y2C), a scaled-up menu 2C is displayed at the position P2C (with the position P2C substantially as the center). When the pointer P is moved to a position P2D(X2D, Y2D), a scaled-up menu 2D is displayed at the position P2D (with the position P2D substantially as the center). Here, the menus have the following relation in size (areas): initial menu 1<scaled-up menu 2A<scaled-up menu 2B<scaled-up menu 2C<scaled-up menu 2D, and the following relation in position: X2A<X2B<X2C<X2D. To put it differently, the larger the value of X-movement of the pointer P, the larger the area of the menu (the initial menu 1 or the scaled-up menu 2). The same applies to the opposite situation. The smaller the value of X-movement of the pointer P, the smaller the area of the menu (the initial menu 1 or the scaled-up menu 2). The menu can be scaled up and down as described above, and thereby the menu having a size desired by the user can be displayed.

2. Switching Menu Items to be Selectable or Non-Selectable

When the user drags the mouse 47 in the X direction, the scaled-up menu (second menu) 2 is displayed at the position P2 as described above. Here, until the value of X-movement of the pointer P reaches a threshold T1 (first threshold), the items included in the menus (the initial menu 1 and the scaled-up menu 2) are non-selectable, and thus are grayed out so as to visually show the user that no selection can be made in the menus. Here, there is a relation of X2A<T1<X2B. Accordingly, items in the initial menu 1 and the scaled-up menu 2A are non-selectable and thus grayed out in the display 48 so as to visually show that they are non-selectable. In contrast, items in each of the scaled-up menus 2B, 2C and 2D are selectable, and thus are not grayed out but displayed in a not grayed-out manner so as to show that they are selectable. The same applies to the opposite situation. When the value of X-movement of the pointer P becomes smaller, the menu items which have been selectable become non-selectable. As described above, the menu items are switched to be selectable or non-selectable. This makes it possible to prevent an erroneous selection of a non-target item due to the relatively small displayed menu.

3. Increasing/Decreasing Menu Items

When the user drags the mouse 47 in the X direction, the scaled-up menu (second menu) 2 is displayed in the position P2 as described above. Here, in response to an event where the value of X-movement of the pointer P exceeds a threshold T2 (second threshold), the number of items in the scaled-up menu 2 are increased. Here, there is a relation of X2C<T2<X2D. Accordingly, the number of items I included in each of the initial menu 1 and the scaled-up menus 2A, 2B and 2C is 11, whereas the number of items I included in the scaled-up menu 2D is 13. The same applies to the opposite situation. When the value of X-movement of the pointer P is decreased, the number of items I included in the menu is decreased (from 13 to 11). In this respect, the default items are preferably items which are more frequently selected than the added items are. The selection frequency can be calculated by the personal computer 4 that stores histories of items selected by the user. Alternatively, the selection frequency may be stored and calculated on a user basis or an object O basis, and thereby the default items and the added items may be dynamically changed based on the calculation result. Still alternatively, the items may be changed in not only two steps but also more steps. The number of items included in the menu are increased and decreased in this manner, and thus varies depending on the size of the menu. This enables easier selection of an item.

In the second phase, based on a value (Y2−Y1) of Y-movement between the position P1 and the position P2, the pointer P is displayed in one of the menu items or in a display region outside the menu (see S106 in FIG. 4). Hereinbelow, a description will be given with reference to FIGS. 7A to 9B. Note that the pointer P is dragged obliquely in the description.

The positional relation between the pointer P and a menu is determined in the following manner. Specifically, when the pointer P is dragged only in the X direction, the pointer P is always displayed approximately in the center of the menu (see FIG. 7A). When the pointer P is dragged in the X and Y directions, a Y coordinate is determined based on the value (Y2−Y1) of Y-movement between the position P1 and the position P2, more precisely, based on an inclination in a dragging direction, that is, (Y2−Y1)/|X2−X1|. Accordingly, when the inclination of the dragging direction is constant ((Y2A−Y1)/|X2A−X1|=(Y2B−Y1)/|X2B−X1|=(Y2C−Y1)/|X2C−X1|), the pointer P always points at an item I2 in the scaled-up menu 2 (see the solid line arrows in FIGS. 8A and 9A). In contrast, in response to an event where the inclination (Y2−Y1)/|X2−X1| exceeds a threshold (third threshold), the pointer P points at a position outside the scaled-up menu 2 (see the dotted arrow in FIG. 9A). In such an implementation, in order to suppress an amount of Y-movement of the pointer P to enhance the usability, more frequently selected menu items should preferably be arranged around the center of the menu, whereas less frequently selected items should be arranged on the upper side (Y direction) of the menu or the lower side (minus Y direction) thereof.

In this embodiment, there are two types of operations (third operations) of selecting an item in the scaled-up menu 2. A description will be given of each of the operations.

One of the third operations is releasing of the right button of the mouse 47 by the user while the pointer P exists in a selectable item in the menu (see S108 in FIG. 4). In this case, an item pointed by the pointer P is selected (see S109 in FIG. 4). For example, as shown in FIG. 9A, when the user releases the right button of the mouse 47 while the pointer P points at the item I2 in the scaled-up menu 2C, the item I2 is selected. On the other hand, when the user releases the right button (see S107 in FIG. 4) while the pointer P exists in a non-selectable item in the menu, the selection is nullified and thus cancelled (S110 in FIG. 4). Specifically, when the user releases the right button while the pointer P exists in the initial menu 1 or the scaled-up menu 2A or while the pointer P exists outside the scaled-up menu 2B, 2C or 2D (see P2C' in FIG. 9A), the selection is cancelled.

The other operation is moving of the pointer P by the user in a first direction (in a direction opposite to a direction from P1 to P2 in the X direction and same as a direction from P1 to P2 in the Y direction) without releasing the right button of the mouse 47 (see S111 in FIG. 4). In this case, if an item pointed by the pointer P does not include a submenu in a lower hierarchical level (see S112 in FIG. 4), the item is selected (see S109 in FIG. 4). If the item pointed by the pointer P includes a submenu, the submenu (third menu) is displayed (see S113 in FIG. 4). For example, if the item I2 in the scaled-up menu 2C pointed by the pointer P includes a submenu, a submenu 3 is displayed appearing from the item I2 when the user moves the pointer P in the opposite direction (in the direction opposite to the direction from P1 to P2 in the X direction and same as the direction from P1 to P2 in the Y direction) (see FIGS. 10A and 10B). In contrast, when the user moves the pointer P in a second direction (in the direction opposite to the direction from P1 to P2 in the X direction and opposite to the direction from P1 to P2 in the Y direction) without releasing the right button of the mouse 47 (see S111 in FIG. 4), the item is not selected and the scaled-up menu 2 is only scaled down (from the scaled-up menu 2C to the scaled-up menu 2B) (see S105 in FIG. 4 and FIGS. 11A and 11B).

Figure 12:
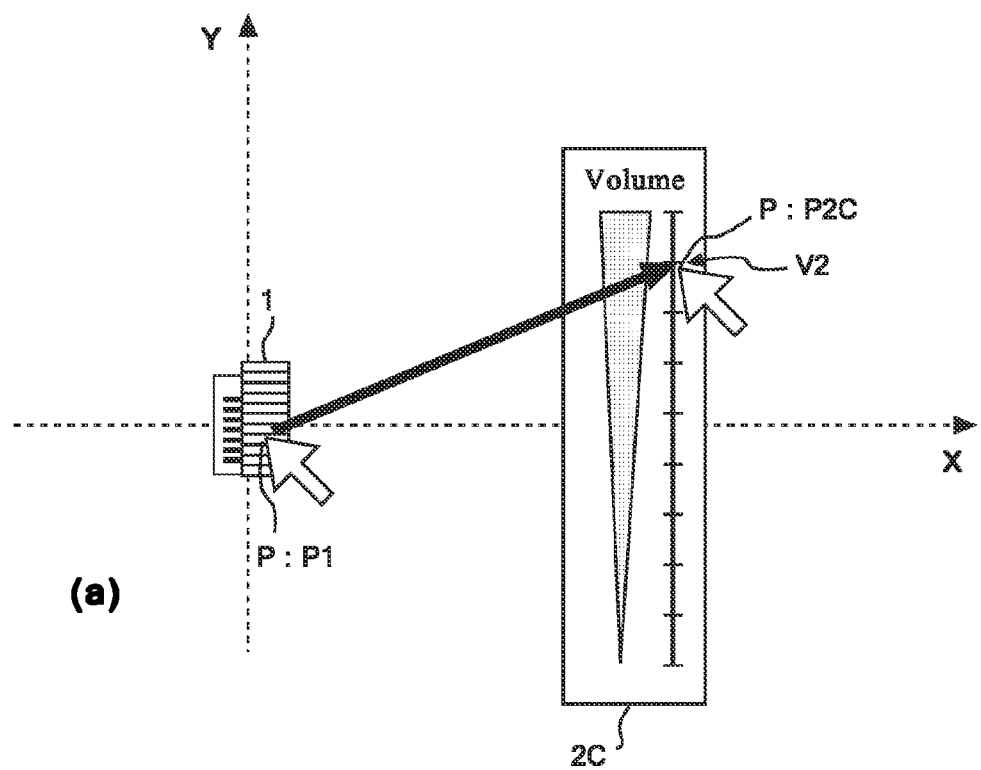
FIGS. 12A and 12B show an operation of the mouse (FIG. 12(*b*)) by the user and a state of the display region of the display (FIG. 12(*a*)) according to the operation.
Figure 12:
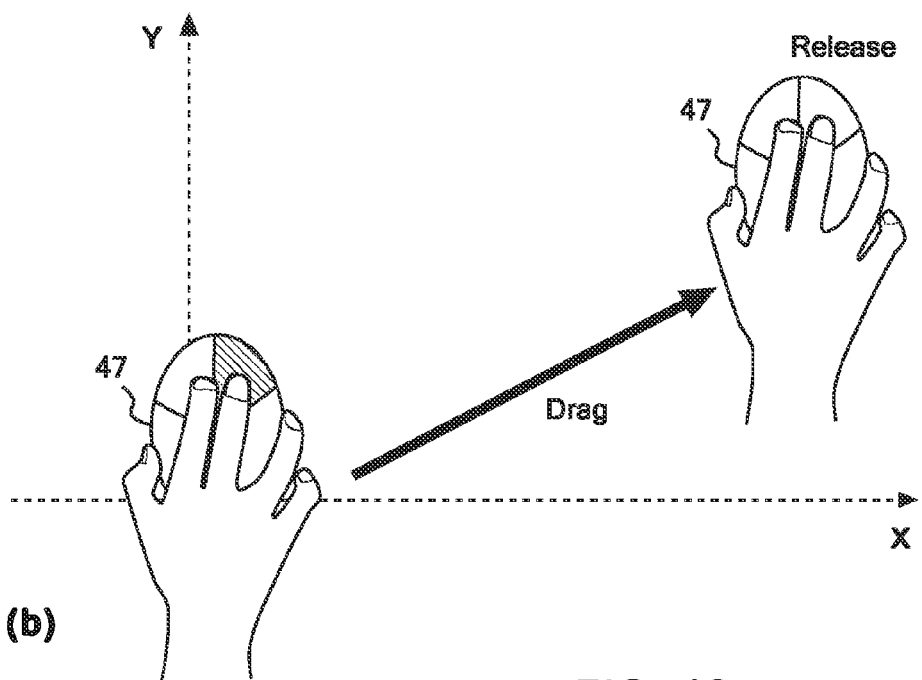

The embodiment of the present invention has been described above. An item in the menu is selected in the description of this embodiment. However, when the item corresponds to a numerical value of a parameter, the parameter may be selected from the menu in the similar manner. FIGS. 12A and 12B show how a volume parameter is selected. Similarly, a desirable parameter (volume value) can be easily selected based on the inclination of the movement of the pointer P. A menu structure may also be employed in which a parameter can be selected in a submenu of an item as shown in FIGS. 10A and 10B.

Note that aspects of the present invention can be implemented by not only a method but also hardware, software or a combination of both. For example, a touch panel or a tablet can be employed as the pointing device. Implementation with a data processing system having a predetermined program is a typical example of the implementation by a combination of hardware and software. In such a case, the predetermined program is loaded and executed on the data processing system, thereby controlling and causing the data processing system to perform processing according to aspects of the present invention. The program consists of an instruction set which can be expressed in any selected language, codes or expressions. Such an instruction set enables the system to directly execute a particular function, or to execute the particular function after being subjected to any one or both of the followings: 1. conversion into any other language, codes or expressions, and 2. copy to another medium.

As a matter of course, the scope of the present invention includes not only such a program itself, but also a medium recording the program. The program for implementing the functions according to aspects of the present invention can be stored in any computer readable medium such as a flexible disk, an MO, a CD-ROM, a DVD, a hard disk device, a ROM, an MRAM and a RAM. The program to be stored in the computer readable medium can be obtained by downloading the program from another data processing system connected through a communications line, or by making a copy of the program in another medium. Moreover, the program can be compressed to be stored in a single storage medium, or divided into multiple pieces to be stored in multiple storage media. It should be noted that a program product to implement aspects of the present invention may be naturally provided in various forms.

A pseudo code is shown below for explaining details of the configuration of aspects of the present invention. However, details in implementation are omitted in the pseudo code for facilitating the explanation. For example, when the mouse 47 is dragged not to the right but to the left, an amount of movement in the X direction is represented by a minus value. The pseudo code does not describe processing for this operation. In addition, the pseudo code does not refer to the order of menu items displayed (whether or not to display the menu items in the opposite order) for a case where the amount of movement is a minus value. When the amount of movement is a minus value, the menu items may be displayed in opposite, or not in opposite. Either way that is more natural to the application may be selected.

```
int MENU_H_USUAL=24 /* Example: Usual height of a menu item */
int MENU_W_USUAL= 60 /* Example: Usual width of a menu item */
int MIN_FONT_HEIGHT= 6 /* Example: Minimum height of a menu item to be set as
selectable. Based on the height of a minimum font. */
   int X_TO_Y_RATIO= 5 /* Example: Menu item is 24 dots high in a case of 120 dots
movement in the X direction */
   #define POS_CENTER1
   #define POS_UPPER2
   #define POS_LOWER3
   typedef struct {
   booleandisplayed
   int menuid
   int distance
   } MENUINFO
   main
   ...
   MENUINFO menuinfo[10]/* Up to 10 levels are temporarily set. */
   GetMouseInfo(&x, &y, &button )/* Get coordinates and the state of the button from the
mouse. */
      if ( button is pressed )
         ScalableMenu( x, y, N, pos_center, menuinfo, 0 )
         /* Selected menuid and distances to the selected menu are returned to the array
         menuinfo. */
         /* For simplicity of explanation, determination logic of how many submenus to
         be displayed or selected is omitted. */
      endif
   end
   ScalableMenu( int x0, inty0, int N, int menu_pos_mode, MENUINFO *menuinfo,int
depth )
      selectable = false/* A menu displayed in small size is not selectable and thus grayed out.
*/
      curr_menuid= -1
      prev_y = -1
      GetMouseInfo(&x, &y, &button )/* Get coordinates and the state of the button from the
mouse. */
         while ( button is not released )
            menu_h = ( x - x0 )/X_TO_Y_RATIO/* The height of a menu item is proportional
            to x-movement amount. */
            /* Here, for simplicity of explanation, a case of x smaller than x0 is not included.
            */
               if menu_h == 0/* If menu_h is zero, display the menu in the minimum size. */
                  menu_h = 1/* In this case, strictly speaking, the height of a menu item is
                  not proportional to an x-movement amount. */
                  selectable = false
               elseif ( menu_h < MIN_FONT_HEIGHT ) /* Not selectable if the height of the
            menu is lower than the minimum displayable font size, because the menu is not readable.
            */
                  selectable = false/* For a well-trained user, the menu may be set to be
                  selectable. */
```

```
      else
         selectable = true
         if menu_pos_mode == POS_CENTER
            ypos_in_menu = y - ( y0 - menu_h* N/2 )
         else menu_pos_mode = POS_UPPER
            ypos_in_menu = y - ( y0 - menu_h* N )
      else
         ypos_in_menu = y - y0
      endif
         if ( ypos_in_menu < 0 )/* The pointer is located above the menu. */
            curr_menuid = -1
         else
            curr_menuid = ypos_in_menu/ menu_h
            if curr_menuid >= N/* The pointer is located below the menu. */
               curr menuid = -1
            endif
         endif
      endif
   menu_w = menu_h * MENU_W_USUAL /MENU_H_USUAL
      if (menu_h < prey_menu_h)/* The mouse is determined to have been moved in a
direction opposite to the X direction based on the calculated menu h. */
      /* This is because determination based on the previous x and the current x results in no
play in displaying timing of a submenu, */
      /* and thus submenu is displayed in response to a small event. */
         if ( y <= y0 && y < prev_y )
            ScalableMenu( x, y, POS_UPPER, menuinfo, depth + 1 )
            break
         else ( y > y0 &&y > prev_y )
            ScalableMenu( x, y, POS_LOWER, menuinfo, depth + 1 )
            break
         endif
      endif
      UpdateMenu( selectable, N, menu_h,menu_w, menu_pos_mode) /* Display and update
the menu. */
      * If selectable is false, the menu is grayed out to show it is non-selectable. */
      prev_y = y
      prey_menu_h = menu_h
      GetMouseInfo( &x, &y, &button )
   endwhile
   menuinfo[depth ].menuid = curr_menuid
   menuinfo[depth ].distance = calculate_distance( x, y, x0, y0 )
   return
   end
```

The present invention can provide a method, a computer program and a computer system by which operations of selecting a menu and designating an amount are performed in more efficiently in a GUI environment.

What is claimed is:

1. A method for operating a pointer in accordance with an operation by a user, the method comprising:
   storing a position of a pointer displayed in a display region of a display device of a computer system as a first position in response to receipt of a first operation performed by the user, where a pointing device operates the pointer;
   displaying a first menu including a plurality of items at a position corresponding to the first position;
   storing a position of the pointer as a second position in response to receipt of a second operation performed by the user; and
   displaying a second menu changed from the first menu based on a distance between the first position and the second position;
   wherein:
      the items of the first menu are displayed in a selectable manner in response to an event where the distance between the first position and the second position exceeds a first threshold;
      the items of the second menu include the plurality of items from the first menu and one or more items not included in the first menu in addition to the items included in the first menu; and
      the items of the second menu that are not included in the first menu are displayed in a selectable manner in response to an event where the distance between the first position and the second position exceeds a second threshold higher than the first threshold.

2. The method according to claim 1, further comprising designating an object in the display region by using the pointer to perform the first operation.

3. The method according to claim 1, further comprising displaying a display region of the second menu larger than a display region of the first menu.

4. The method according to claim 1, further comprising scaling up the display region of the second menu with an increase of the distance between the first position and the second position, and scaling down the display region of the second menu with a decrease of the distance between the first position and the second position.

5. The method according to claim 1, further comprising displaying items in the second menu in a selectable manner in response to an event where the distance between the first position and the second position exceeds a first threshold.

6. The method according to claim 1, further comprising providing items included in the first menu that are more frequently selected than the item not included in the first menu.

7. The method according to claim 1, further comprising:
   designating the first position as P1(X1, Y1) and the second position as P2(X2, Y2), and displaying the second menu such that the second menu changed from the first menu based on a value of X2-X1 or a value of Y2-Y1.

8. The method according to claim 1, further comprising selecting one of the items included in the second menu in response to receipt of a third operation performed by the user.

9. The method according to claim 8, further comprising:
implementing the pointing device as a mouse having a button such that the first operation is an operation of pressing the button, the second operation is an operation of moving the mouse with the button kept pressed, and the third operation is an operation of releasing the button.

10. The method according to claim 8, further comprising corresponding the plurality of items included in the second menu to parameter values, respectively.

11. The method according to claim 8, further comprising:
providing the one item as including a third menu in a lower hierarchical level, and
displaying the third menu in response to selection of the one item.

12. The method according to claim 1, further comprising:
designating the first position as P1(X1, Y1) and the second position as P2(X2, Y2),
providing the second menu with a plurality of items arranged in a Y direction,
displaying the second menu as the second menu changed from the first menu based on a value of X2-X1, and
selecting one of the plurality of items based on a value of Y2-Y1 in response to receipt of a third operation performed by the user.

13. The method according to claim 1, further comprising:
designating the first position as P1(X1, Y1) and the second position as P2(X2, Y2),
providing the second menu with a plurality of items arranged in the Y direction,
displaying the second menu as the second menu changed from the first menu based on a value of X2-X1, and
selecting none of the plurality of items on condition that a value of Y2-Y1 exceeds a third threshold, in response to receipt of a third operation performed by the user.

14. The method according to claim 1, further comprising:
designating the first position as P1(X1, Y1) and the second position as P2(X2, Y2),
providing the second menu as including a plurality of items arranged in a Y direction,
displaying the second menu such that the second menu changed from the first menu based on a value of X2-X1 is displayed,
selecting one of the plurality of items based on a value of Y2-Y1 in response to receipt of a third operation performed by the user, and
displaying a third menu in a lower hierarchical level on condition that the one item includes the third menu.

15. The method according to claim 14, further comprising:
moving the pointer in the third operation in a direction opposite to a direction from P1 to P2 in an X direction, and same as a direction from P1 to P2 in the Y direction, and
displaying the third menu at a side of the one item in the direction opposite to the direction from P1 to P2 in the X direction.

16. The method according to claim 14, further comprising:
implementing the pointing device as a mouse having a button, such that the first operation is an operation of pressing the button, the second operation is an operation of moving the mouse in a certain direction with the button kept pressed, and the third operation is an operation of moving the mouse in another direction with the button kept pressed.

17. Computer-readable hardware with a program stored thereon, wherein the program instructs a processor to execute:
storing a position of a pointer as a first position in response to receipt of a first operation performed by a user;
displaying a first menu including a plurality of items at a position corresponding to the first position;
storing a position of the pointer as a second position in response to receipt of a second operation performed by the user; and
displaying a second menu changed from the first menu based on a distance between the first position and the second position;
wherein:
the items of the first menu are displayed in a selectable manner in response to an event where the distance between the first position and the second position exceeds a first threshold;
the items of the second menu include the plurality of items from the first menu and one or more items not included in the first menu in addition to the items included in the first menu; and
the items of the second menu that are not included in the first menu are displayed in a selectable manner in response to an event where the distance between the first position and the second position exceeds a second threshold higher than the first threshold.

18. A computer system comprising:
a display device;
a pointing device for operating a pointer displayed in a display region of the display device in accordance with an operation by a user;
a storage unit; and
an arithmetic and control unit, wherein:
the arithmetic and control unit is configured to cause:
the storage device to store a position of the pointer as a first position in response to receipt of a first operation performed by the user;
the display device to display a first menu including a plurality of items at a position corresponding to the first position;
the storage device to store a position of the pointer as a second position in response to receipt of a second operation performed by the user; and
the display device to display a second menu changed from the first menu based on a distance between the first position and the second position;
wherein:
the items of the first menu are displayed in a selectable manner in response to an event where the distance between the first position and the second position exceeds a first threshold;
the items of the second menu include the plurality of items from the first menu and one or more items not included in the first menu in addition to the items included in the first menu; and
the items of the second menu that are not included in the first menu are displayed in a selectable manner in response to an event where the distance between the first position and the second position exceeds a second threshold higher than the first threshold.

* * * * *